(12) United States Patent
Wu et al.

(10) Patent No.: US 11,586,468 B2
(45) Date of Patent: Feb. 21, 2023

(54) DOCKER-CONTAINER-ORIENTED METHOD FOR ISOLATION OF FILE SYSTEM RESOURCES

(71) Applicant: Huazhong University of Science and Technology, Hubei (CN)

(72) Inventors: Song Wu, Hubei (CN); Hai Jin, Hubei (CN); Ximing Chen, Hubei (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 475 days.

(21) Appl. No.: 16/752,918

(22) Filed: Jan. 27, 2020

(65) Prior Publication Data

US 2020/0326984 A1 Oct. 15, 2020

(30) Foreign Application Priority Data

Apr. 12, 2019 (CN) .......................... 201910291570.3

(51) Int. Cl.
*G06F 9/50* (2006.01)
*G06F 16/17* (2019.01)

(52) U.S. Cl.
CPC ............ *G06F 9/5011* (2013.01); *G06F 16/17* (2019.01)

(58) Field of Classification Search
CPC ................................ G06F 9/5011; G06F 16/17
See application file for complete search history.

(56) References Cited

U.S. PATENT DOCUMENTS

| 2006/0294524 | A1* | 12/2006 | Vega ..................... G06F 9/5027 703/23 |
| 2012/0254139 | A1* | 10/2012 | Song ................... G06F 16/9024 707/704 |
| 2017/0124109 | A1* | 5/2017 | Curtis-Maury ..... G06F 16/1858 |
| 2018/0146069 | A1 | 5/2018 | Du et al. |
| 2018/0173567 | A1* | 6/2018 | Olshefski ............ G06F 12/1009 |
| 2020/0012507 | A1* | 1/2020 | Li .......................... G06F 9/4881 |

FOREIGN PATENT DOCUMENTS

| CN | 106708622 | | 5/2017 |
| CN | 106874125 A | * | 6/2017 |
| CN | 107885748 | | 4/2018 |
| CN | 109213573 | | 1/2019 |

OTHER PUBLICATIONS

Kang et al. "Multilanes: Providing virtualized storage for os-level virtualization on manycores." ACM Transactions on Storage (TOS) 12.3, pp. 1-31 (Year: 2016).*
Office Action of CN201910291570.3.

* cited by examiner

*Primary Examiner* — Meng Ai T An
*Assistant Examiner* — Willy W Huaracha
(74) *Attorney, Agent, or Firm* — Michael Ye; Rimon Law (57) ABSTRACT

The present invention relates to a Docker-container-oriented method for isolation of file system resources, which allocates host file system resources according to access requests from containers and checks lock resources corresponding to the access requests. The method creates a plurality of new containers; allocating the host file system resources according to file resource request parameters required by the new containers; and controlling execution of the file system operation according to an amount of the file system resources that have been allocated to the new containers.

3 Claims, 3 Drawing Sheets

C1: determine whether container about to be deleted is "restricted" when initially created C2: releasing the file system resources allocated during creation of container C3: deleting the container

FIG. 4

DOCKER-CONTAINER-ORIENTED METHOD FOR ISOLATION OF FILE SYSTEM RESOURCES

FIELD

The present invention relates to virtualization systems, and more particularly to a Docker-container-oriented method for isolation of file system resources.

DESCRIPTION OF RELATED ART

Presently, virtualization is one of the critical technical means for increasing device utilization in cloud computing environments. The emergence of Docker has driven the development of OS-level virtualization. As a result, due to their advantages related to high performance, quick launch and low overhead, containers have increasingly replaced virtual machines in cloud computing environments. However, while being superior to virtual machines in terms of performance, containers are inferior in terms of isolation. This is because containers share the same operation system kernel. Besides, since containers are lighter than virtual machines, more containers can be deployed in a server than virtual machines, and this means that resource competition is severer between containers than between virtual machines.

Performance isolation between containers may be achieved by means of a cgroup system in a kernel. It provides processes with isolation for CPU, Memory and I/O. For example, a blkio sub-system assigns a weight for each process, so that when a cfq scheduler is used for I/O scheduling, each process can get a scheduling time slice relevant to its weight, thereby accomplishing I/O isolation between containers. These isolation means, nevertheless, provide no counterplot to competition caused by kernel sharing. For example, when plural containers create files simultaneously, they have to apply to the host file system for inodes, and the inodes of all the files form a global linked list that is protected by a lock. Thus, when plural containers create files simultaneously, they compete for this lock and adversely affect each other. Additionally, due to the fact that these containers share the resources of the host file system, when there is a malicious container creating a huge amount of files, it can exhaust all inodes in the host file system, preventing the other containers from creating files.

As an approach to improving pool isolation ascribed to kernel sharing, the resources of the host file system are partitioned and abstracted into plural entities that are independent of each other, and the part of an I/O stack shared by plural processes is isolated so that each process has a separated I/O stack. However, the know approach involves altering the host file system, and is not suitable for Docker containers because Docker containers use storage drivers to manage images and containers and different storage drivers have different requests to the host file system. Additionally, due to its nature of storing images and containers in different layers, Docker containers have deeper and more complex I/O stacks, and thus can introduce additional isolation-related problems. For example, China Patent Publication No. CN106874125A discloses a method and device for sharing system resources among container systems. The known method comprises: when the kernel detects an access request from any of the container systems to the device, identifying the resource lock in the access request that matches up the system resources corresponding to the device; based on the resources lock matching up the system resources, determining state information of the system resources; according to the state information of the system resources, locking the system resources, and allocating the locked system resources to the container system, for the container system to exclusively access the system resources.

It is clear from the above that the existing performance isolation means for Docker containers is about performance isolation directly related on hardware, and is irrelevant to isolation issues caused by kernel sharing. Similarly, the technical means for addressing isolation issues caused by kernel sharing is not suitable for Docker containers. Therefore, the present invention is proposed with the attempt to provide a method for isolation of resources of container file systems, which eliminate sharing by allocating file system resources to individual container file system instance so as to prevent lock competition in shared kernels and competition for file system resources, thereby preventing performance interference caused by competition and in turn improving isolation.

Since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY OF THE INVENTION

A word "module" as described in the description refers to a hardware, a software or any combination of a hardware and a software which can execute the function related to "module".

As a solution to the foregoing problems, the present invention provides a Docker-container-oriented method for isolation of file system resources that address isolation-related issues caused by lock competition in shared kernels and competition for file system resource. which allocates host file system resources according to access requests from containers and checks lock resources corresponding to the access requests, the method at least comprising steps of classifying the lock resources into first locks that can be fined and second locks that cannot be fined based on granularity of the lock resources, and creating a plurality of new containers by configuring fine replicas of the first locks to form respective locks; allocating the host file system resources according to file resource request parameters required by the new containers and classifying the new containers as first tag containers and second tag containers based on an allocation result; and where the first tag container or the second tag container executes a file system operation and shows lock competition or needs to use the file system resources, controlling execution of the file system operation according to an amount of the file system resources that have been allocated to the first tag container or the second tag container.

According to one preferred embodiment, the allocation of the host file system resources is executed during creation of the new containers, and the allocation result is determined by whether the remaining host file system resources satisfies the file resource request parameter, in which this comprises: where a remaining amount of the host file system resources is greater than or equal to an amount of resources required by the creation of the new containers, allocating the host file system resources required by the new containers and classifying these new containers as the first tag containers, or where the remaining amount of the host file system resources is smaller than the amount of resources required by the creation of the new containers, allowing the new containers to share all the remaining host file system resources and classifying these new containers as the second tag containers.

According to one preferred embodiment, controlling the execution of the file system operation at least comprises steps of determining whether there is lock competition in the file system operation, sand where there is lock competition in the file system operation and the competition is about the first locks, preventing the new containers from lock competition by making the new containers acquire the fine replicas; where the file system operation needs to acquire the host file system resources, configuring the first tag containers for: proceeding with the file system operation if the host file system resources required by the file system operation does not exceed the host file system resources allocated for it, and configuring the second tag containers for proceeding with the file system operation if the host file system resources required by the file system operation does not exceed the remaining resources of an underlying file system.

According to one preferred embodiment, the method further comprises steps of releasing the file system resources allocated thereto where the first tag containers are deleted; updating the remaining amount of the host file system resources; and ending the file system operation corresponding to the second tag containers by deleting the second tag containers directly.

According to one preferred embodiment, the fine replicas of the first lock are configured to the new containers by configuring relevant UnionFS (Union File System) instances for the new containers, and adding relevant field information to source codes of the container file system so that the fine replicas are included in container file system instances (4) corresponding to the new containers during the creation of the new containers; and configuring at least one new lock function for the UnionFS instances, so that when the new containers execute the file system operation, the new containers acquire the fine replicas of the corresponding UnionFS instances according to the lock function.

According to one preferred embodiment, the method further includes at least being capable of addressing demands for the host file system resources according to characteristics of workloads operated by the new containers during the creation of the new containers, in which the host file system resources at least comprise file system soft resources composed of inodes and file descriptors.

The present invention provides a Docker-container-oriented system for isolation of file system resources that address isolation-related issues caused by lock competition in shared kernels and competition for file system resource. which allocates host file system resources according to access requests from containers and checks lock resources corresponding to the access requests, at least comprising a file operation system calling module, a system kernel and a plurality of containers, wherein requests from applications in the containers can be transmitted to the system kernel through the file operation system calling nodule to call relevant kernel functions to accomplish desired processing, in which the system at least comprises a fine lock module and a file system resource allocation module. The fine lock module is configured for classifying the lock resources into first locks that can be fined and second locks that cannot be fined based on granularity of the lock resources; The file system resource allocation module is configured for creating a plurality of new containers by configuring fine replicas of the first locks to form respective locks; allocating the host file system resources according to file resource request parameters required by the new containers and classifying the new containers as first tag containers and second tag containers based on an allocation result; and where the first tag container or the second tag container executes a file system operation and shows lock competition or needs to use the file system resources, controlling execution of the file system operation according to an amount of the file system resources that have been allocated to the first tag container or the second tag container.

According to one preferred embodiment, wherein the system further comprises a file system resource statistics module, which is configured for identifying a total amount and a remaining amount of the file system soft resources during the creation of new containers so as to determine whether host file system resources required by the new containers can be allocated to the new containers.

According to one preferred embodiment, wherein the system kernel at least comprises an underlying file system, a container UnionFS and a virtual file system, in which the virtual file system is provided with the kernel functions and the container UnionFS is configured to enable the containers to access the underlying file system.

According to one preferred embodiment, wherein a file system operation corresponding to the containers is transmitted to the underlying file system through the virtual file system and the container UnionFS successively, in which the container UnionFS is such configured that each container is configured with container file system instances.

The present invention has the following beneficial technical effects:

(1) Improved isolation: Docker-based performance isolation has depended on cgroups and is suitable for CPUs, memories and I/O, but is ineffective against isolation issues related to kernel sharing. The present invention, based on the existing isolation approaches, eliminates isolation-related problems cause by shared lock and shared file system resources and further improves isolation among containers. The existing isolation solutions against kernel sharing give no consideration to new isolation-related problems introduced by container union file systems.

(2) Simple and flexible isolation mechanism: the present invention is focused on partitioning and allocating host file system resources to individual containers, so as to transfer resources management from the host file system to the container file system, thereby providing a technical means for isolation of file system resources for containers. The technical means of the present invention is about allocation on demand, which means that as long as the file system resources required by the containers can be satisfied, the resources are provided to the containers. Even if the file system resources required by the containers cannot be satisfied, creation of containers will not fail because the containers can still use all the remaining resources of the host file system.

(3) Easy use due to less alternation to kernels: the present invention involves only modification of the container file system, which is a hot-plugging kernel module so there is no need to compile the system kernel from beginning, and the only thing needs to do is recompiling and loading the kernel module.

(4) The present invention transfers the use and record of the file system resources to the container UnionFS, so that the container file system decouples from the underlying host file system, thereby providing a solution for free competition among containers for resources of the underlying file system in the existing cloud computing environment and preventing any container from monopolizing underlying file system resources, in turn improving operational performance of a container file system.

DETAILED DESCRIPTION OF THE INVENTION

The invention as well as a preferred mode of use, further objectives and advantages thereof will be best understood by reference to the following detailed description of illustrative embodiments when read in conjunction with the accompanying drawings.

For clarity, some technical terms used in this document are defined as below:

Container: an open-source application engine capable of packing software into standardized units for development, delivery and deployment;

Lock: a share lock or an exclusive lock, which is such used that before a transaction performs operation on a certain data object, the transaction can require the system to lock the very data object, so that the transaction has control over the data object and other transactions are prevented from updating the locked data object until the transaction releases the lock;

Host file system resources: file system soft resources composed of inodes and file descriptors, which support containers to execute file system operation;

UnionFS instance: a result of uniting different directories as a union using, for example, an AUFSunion file system and mounting the union to the desired directory, so as to allow users access computer files and directories in a storage device through a file system; and Lock function: a program algorithm that locks data objects.

Embodiment 1

The present invention provides a Docker-container-oriented system for isolation of file system resources that address isolation-related issues caused by lock competition in shared kernels and competition for file system resource. The system analyzes locks used during file system operation to find out a predetermined amount of coarse-grained locks and then allocates a fine-grained lock for each container as a replica of the coarse-grained lock, thereby preventing competition for a single coarse-grained lock among plural containers without causing inconsistency. By allocating file system resources to each container file system instance, sharing can be eliminated so as to prevent competition-incurred performance interference and improve isolation.

Figure 1:
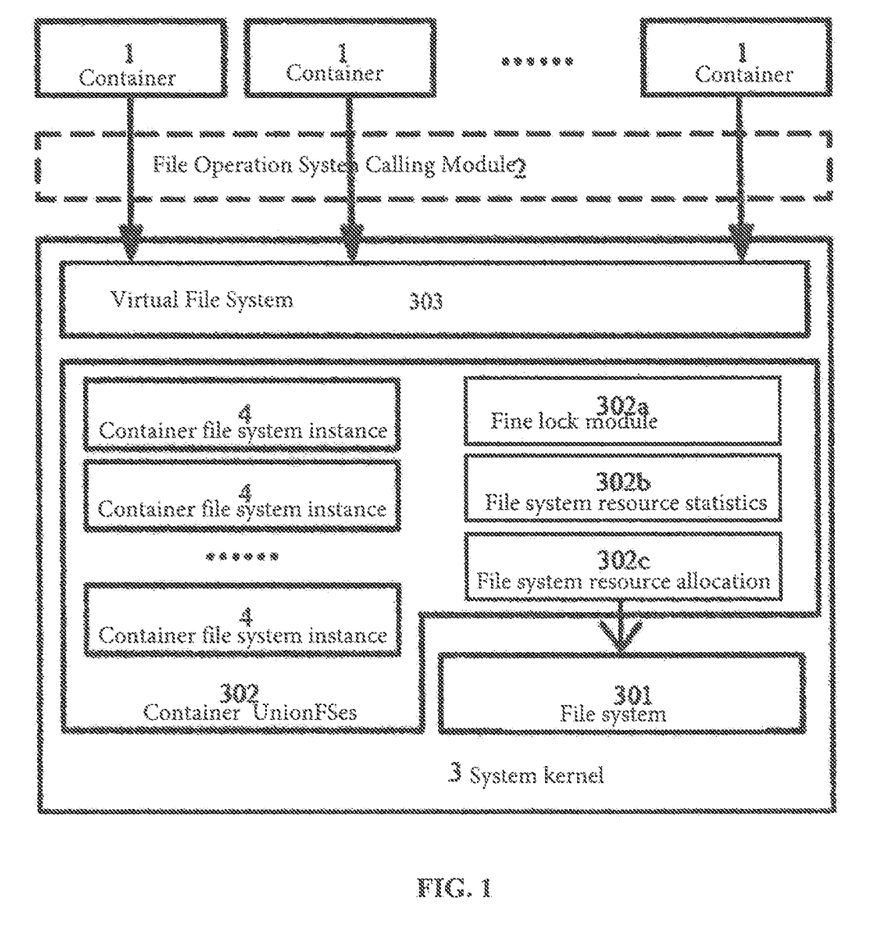
FIG. 1 is a structural diagram of a system for isolation of file system resources according to one preferred embodiment of the present invention.

Particularly, as shown in FIG. 1, the file system resources isolation system at least comprises a plurality of containers 1, a file operation system calling module 2 and a system kernel 3. Through the file operation system calling module 2, a request from an application in the container 1 can be transmitted to the system kernel for calling relevant kernel functions to accomplish the desired processing. The system kernel 3 at least comprises an underlying file system 301, container UnionFSes 302 and a virtual file system 303. The virtual file system 303 is provided with kernel functions. When some process launches a file-oriented system calling, the system kernel 3 calls the relevant kernel functions in the virtual file system 303. The containers 1 can access the underlying file system 301 through the container UnionFSes 302.

Preferably, also referring to FIG. 1, file system operations in a container 1 first pass through the virtual file system 303 and arrive at the container UnionFSes 302 before undergoing a series of operation transformations and arriving at the underlying file system 301. The container UnionFSes 302 provide each container with a corresponding container file system instance 4, respectively. Each container 1 shares the same underlying file system 301, so competition may occur among them when the underlying file system 301 needs to get a lock or needs to get file system resources. In the present invention, lock allocation and file system resources allocation traditionally in the underlying file system 301 are transferred to the container UnionFS 302 to construct the fine lock module 302a, the file system resource statistics module 302b and the file system resource allocation module 302c. In virtue of the fine lock module 302a, the file system resource statistics module 302b and the file system resources allocation module 302c, resource use of the containers 1 can be controlled. Since resources allocation has been established during, creation of the containers 1, there is no competition among the containers 1.

Preferably, when the file system resources isolation system executes file system operation, it implements the fine lock module 302a to analyze and classify the locks it uses. Sharing the same host file system among containers 1 can lead to competition for lock resources. In the use environment of the containers 1, some lock resources may be specially processed by allocating an individual replica to each container so that the containers 1 are prevented from competing for the same lock. Particularly, during creation of new containers, the new containers are allocated with locks that can be specially processed. In other words, the fine lock module 302a allocates each container 1 with a fine-grained lock in the host file system when that container 1 is created. Therein, the fine lock module classifies lock resources into first locks and second locks. The first lock that can be fined is made by statistically analyzing kernel code and Docker source code of the file system operation, but not dynamically determined during creation of the containers. For example, when the host file system executes a first rename operation, since renaming a file involves altering the source directory src and the destination directory des of the file, for ensuring consistency of the file system, the two directories have to be locked before the foregoing alternation. Assuming that the source directory is locked before the destination directory is locked, if there is simultaneously a second rename operation from the destination directory to the source directory, the locking sequence between the first rename operation and the second rename operation is reversed, and thus both of the first rename operation and the second rename operation can get only one but not both of the locks, finally leading to deadlock. For preventing this, the present invention uses the host file system to provide a file-system-level lock, so that any rename operation before having the directories locked has to be locked at the file system level, thereby effectively preventing deadlock. At the same time, all the rename operations in the host file system compete for locks of the same file system level. Docker container applies special processing to the corresponding rename operation. Since Docker containers have their storages isolated from each other, the source directory of the first container to be locked for rename and the source directory of the second container to be locked for rename do not overlap, and the destination directory of the first container to be locked for rename and the destination directory of the second container to be locked for rename do not overlap, so that deadlock is prevented from happening. Preferably, Docker containers do not need to compete for shared file-system-level locks. The file-system-level locks can act as coarse-grained locks and can be further fined. In other words, the file-system-level locks may be classified as first locks, and directory-level locks may be classified as second locks. For example, a fine-grained replica may be allocated to the UnionFS instance of each container, and a new rename lock function is realized in the container file system. When containers execute rename operation, they acquire the fine replicas in their respective UnionFS instances according to new rename lock functions, thereby eliminating competition for coarse-grained locks and eventually improving isolation. Each container has a container UnionFS instance, fining lock resources means fining and distributing locks in the shared underlying file system into each container UnionFS instance, so as to prevent containers from competing for shared lock resources and in turn incurring problems about sequential execution of the file system operation. Docker is an open-source application container engine, and allows developers to pack their applications or dependency packages to portable containers that are to be distributed to any popular Linux machine later.

Preferably, fining of lock resources and resources allocated by the file system resource allocation module 302c are different. The file system resources allocated in the file system resource allocation module 302c have a total amount in the host file system, while the lock resources are not limited to a certain total amount, and are only about fining the locks in the Docker environment for rename operation that are coarse enough to cause competition. Since there is no limit in terms of total amount, whenever a container is created, a fined replica of a lock that can be fined is allocated to the newly created container. The file system resource allocation module 302c is configured to set up corresponding UnionFS instances for new containers, and add relevant field information to the container file system source code so that the new containers, when created, have their corresponding container file system instances including fine replicas, and also configure UnionFS instances with at least a new lock function, so that when new containers execute file system operation, the new containers can acquire fine replicas in the respectively corresponding UnionFS instances according to the lock functions. Preferably, the fine lock module 302a realizes custom file system operation for the containers 1. When executing file system operation, the containers 1 can avoid the path where they traditionally compete for locks, and acquire their respectively corresponding locks instead, thereby improving lock isolation among the containers 1. A rename operation is a good example for a custom file system operation. In order not to affect rename in the host, the known solutions often prevent modification of the locking logic originally set for rename operation in the host file system. Differently, the present invention fines file-system-level locks in the initial rename locking logic and allocates them to individual containers, thereby preventing the containers from competing for the initial coarse-grained locks according to the initial locking logic. Thus, according to the present invention, in the container file system, at least one new rename lock function is set for the containers. The rename lock function, when locking the renamed directories, follows the initial locking logic. At this time, the containers do not compete for the initial coarse-grained lock, and instead they acquire the fine-grained locks allocated thereto, respectively. With the foregoing means, rename in the host file system is not adversely affected and rename operation in the containers can avoid competition for lock resources, thereby improving isolation of the containers. Particularly, the original locking sequence of the rename lock function is: the host file system coarse-grained lock, the lock for the source directory, the lock for the destination directory. After the locks are fined, assuming that a rename operation is to be executed in a container, if locking is performed using the original lock function, competition for host file system coarse-grained lock still occur. Therefore, there is a need for a new rename lock function, which performs locking the sequence of: the container file system instances, locks of the source directory and locks of the destination directory. At this time, competition can be prevented as long as the containers perform locking in accordance with the new rename lock function.

Preferably, during creation of the new containers, the file system resource statistics module 302b is at least capable of identifying the requirement to the host file system resources according to the characteristics of the workloads running in the new containers. The host file system resources at least comprises file system soft resources composed of inodes and file descriptors. Therein, during creation of the new containers, it is necessary to determine whether it is possible to provide the resources required by the new containers according to information on the total amount and remaining amount of the file system soft resource. The file system resource statistics module 302b knows the total amount and remaining amount of the file system soft resources in the host file system, such as inodes and file descriptors.

Preferably, the file system resource allocation module 302c serves to allocate the file system resources. Creation of the new containers uses the information on current use of resources provided by the file system resource statistics module 302b. Then the resources required by the newly created container are allocated to the containers, and the remaining amount of resources is updated. When the containers are deleted, the resources allocated to the containers during their creation are retrieved, and the remaining amount of resources is updated. Preferably, the file system resource allocation module is further configured to create a plurality of new containers in a way of configuring the fine replicas of the first locks to form separate locks. According to the file resource request parameter required nu the new containers, the host file system resources are allocated and a plurality of new containers are classified as first tag containers and second tag container based on the allocation result. Where execution of the file system operation by the first tag containers or the second tag containers encounters lock competition or needs file system resources, execution of the file system operation is controlled according to the amount of the file system resources allocated to the first tag containers or the second tag containers.

Embodiment 2

The present embodiment provides further improvements to Embodiment 1, and what is identical to its counterpart in the previous embodiment will not be repeated in the following description.

The present invention further provides a Docker-container-oriented method for isolation of the file system resources. The method at least comprises the following steps.

In S1, the file system resource allocation module 302c allocates the host file system resources according to the demand of the containers 1, and differentiates the containers allocated with different host file system resources by tagging the containers.

Particularly, when containers are created by for example Docker, the demand for file system resources is determined according to characteristics of the workloads run by the containers. Different containers have different demands on file system resources. For example, where the container runs I/O intensive workloads for a database or a web server, for example, the container performs considerable file creation operation, and thus requires considerable inode resources. Where the container runs CPU-intensive workloads mainly for computation, the container has relatively low demand on file system resources. Therefore, during creation of a container, a user may explicitly specialize the need for plural file system resources in the command-line parameter for creation of the containers according to the workloads intended to be run in the container.

Preferably, the file system resource allocation module 302c allocates file system resources according to the demand of the containers. The allocation result depends on whether the remaining file system resources can satisfy the demand of the container. For example, when the file system resource allocation module 302c receives the access request to file system resources from the container 1, it acquires the configuration file of the host file system resources. The configuration file may comprise information on occupation priority of host file system resources in different container systems and information on use state of host file system resources. The information on use state of the file system resources related to the access request addressed by the containers can be determined according to the configuration file of host file system resources and it may comprise information on occupation proportion of the file system resources in different containers. At last, it can be determined whether the required file system resources file system resources can be allocated to the container 1 issuing the request based on a predetermined system resources allocation rule according to the information on occupation priority and the information on use state of host file system resources required.

Preferably, the file system resource allocation module is configured to allocate file system resources duration creation of containers, and to determine whether it is possible for the containers to execute file system operation exclusively according to the amount of resources allocated at the time of creation of the containers. For example, when the file system resource allocation module 302c receives the access request to file system resources from the container 1, it checks the remaining amount of the resources using the file system resource statistics module 302b. The file system resource statistics module 302b acquires all information on the file system resources from the host file system when the Docker engine is activated. Such information may include how many inode resources is available in the host file system for allocation. Thus, the file system resources module 302b may at this time determine whether the remaining resources can be provided to the newly created container according to the demand of the container on the file system resources.

Figure 2:
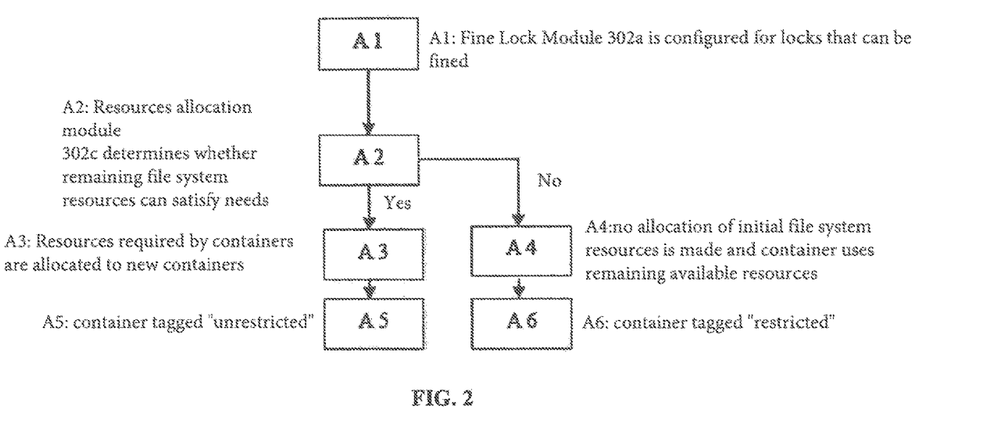
FIG. 2 is a detailed flowchart of creation of containers according to one preferred embodiment of the present invention.

Preferably, after allocation of the file system resources according to the demand of the containers, the containers are tagged for differentiation so as to obtain both the first tag container and the second tag container. For example, the containers satisfying the request requirements and fulfilling the file system resources may be tagged as "restricted" so as to obtain first tag containers, and the containers not satisfying the request requirements and failing to fulfill the file system resources may be tagged as "unrestricted" so as to obtain second tag containers. A container tagged as "restricted" is a container assigned with a relatively reasonable amount of resources when created, so its file system resources can satisfy its needs, and the container only uses the resources allocated to it when it subsequently executes file system operation. A container tagged as "unrestricted" is a container assigned with too many file system resources during its creation, so the remaining resources cannot afford allocation. For example, assuming that the host file system has 3000 available inode resources, when the Docker engine is activated, the file system resource statistics module 302b acquires information on the available amount of the inode resources from the host file system. When a container finishes a request for 1000 inode resources, the file system resource statistics module 302b updates the available amount of the inode resources to 2000. When another newly created container asks for 2500 inode resources, the 2000 inode resources remained cannot satisfy its need. The file system resources assigned initially during creation of the containers according to characteristics of workloads are merely estimated values and may be inaccurate. Where the container is intended to run I/O-intensive workloads, the user may set a greater budget of inode resources during creation of the container than the container actually needs. Thus, in order to normally activate the containers not satisfying initial resources allocation during their creation, the present invention tags these containers as "unrestricted", meaning that they are assigned with too many file system resources when created, and that the remaining resources cannot satisfy allocation. The containers tagged as "unrestricted" share all the file system resources remained. The containers tagged as "restricted" are those assigned with a reasonable amount of resources when created, and the file system resources they requires are satisfied so that the containers only use resources allocated thereto during their creation when they subsequently execute file system operation. Different from the known approach wherein all the containers share the resource of the host file system, the allocation scheme of the present invention provides users with a way to set restriction for containers to use host file system resources by which users can assign the required amount of the file system resources according to the commands needing to be in the created container, and the allocation scheme of the present invention is fully realized in a container file system, with neither change in the host file system nor frequent interaction with the host file system. Instead, the file system resource statistics module 302b only has to acquire resources of the host file system once when the Docker engine is activated. Particularly, as shown in FIG. 2, when containers are created, individual locks are allocated thereto and it is determined whether remaining file system resources satisfy needs of the containers. Where the needs can be satisfied, the containers are allocated with the required file system resources and tagged as "restricted".

Where the remaining file system resources cannot satisfy the needs of the containers, the containers are created using the remaining available file system, and are tagged as "unrestricted". In other words, where the remaining amount of the host file system resources is greater than or equal to the amount required by creation of the new containers, the new containers are allocated with the required host file system resources and classified as first tag containers. Where the remaining amount of the host file system resources is smaller than the amount required by creation of the new containers, the new containers share all the remaining host file system resources and are classified as second tag containers. The first tag containers when executing file system operation only use the file system resources allocated thereto and the second tag containers when executing file system operation share all the remaining file system resources.

Preferably, the container UnionFS 302 may allocate file system resources through the following process.

In Step A1, the fine lock module 302a is configured for locks that can be fined, and serves to allocate each newly created container with a respective replica so to prevent competition for a shared lock among containers during file system operation. Particularly, the lock that can be fined is not dynamically determined if it can be fined during creation of containers, but is instead summarized by reading and analyzing the source code. Thus, during creation of containers only simple allocation is enough. For example, for a lock that can be fined, such as a file-system-level lock for rename operation, the fine lock module 302a adds relevant field information to the source code of the container file system, so that during creation of containers, UnionFS instance s corresponding to the containers can contain fine replicas. In other words, when the UnionFS instance is allocated to each container, the fined lock is synchronously allocated to the relevant container. Particularly, the "field information" is a "member variable". For example, a coarse-grained lock for rename operation has a source code in a host file system being a "member variable" of an exclusive-lock structure. Since the coarse-grained lock can be fined, merely a "member variable" of the identical exclusive-lock structure has to be added to the source code of the container file system. Thereby, when a container is launched, its file system instance contains a fined lock. This process is called "fining" because at this time each container has its own share and no competition exists. The coarse-grained lock originally for rename operation in the host file system is named with the word "coarse" because this lock is one of its kind and as an original arrangement all the containers would compete for this lock, so the lock is too "coarse" to the container.

In Step A2, the resources allocation module 302c determines whether the remaining file system resources can satisfy the needs of the containers according to the file resource request parameters of the newly created containers. If yes, the process proceeds with Step A3. If not, the process proceeds with Step A4. The file resource request parameter may comprise parameters such as the amount of inodes. When the resources allocation module 302c determines through the container resources statistics module 302b that the remaining resources available for allocation are greater than or equal to the required resources, the resources allocation module allocates the corresponding resources to the newly created containers.

In Step A3, the resources required by the containers are allocated to the newly created containers from the host remaining file system resources, and the remaining amount of the resources is altered. Then the process proceeds with Step A5.

In Step A4, when the remaining file system resources cannot satisfy the required assignment for creation of a container, for ensuring normal; creation of the container, the container is created in the original way, which means no allocation of initial file system resources is made and the container uses the remaining available file system resources. Then the process proceeds with Step A6.

In Step A5, the container is tagged as "restricted".

In Step A6, the container is tagged as "unrestricted".

In S2, the container 1 is configured to execute file system operation with the controlled isolation. When the container executes file system operation, if there is lock competition or there is a need for file system resources, execution of the operation is controlled according to the amount allocated to the container.

Figure 3:
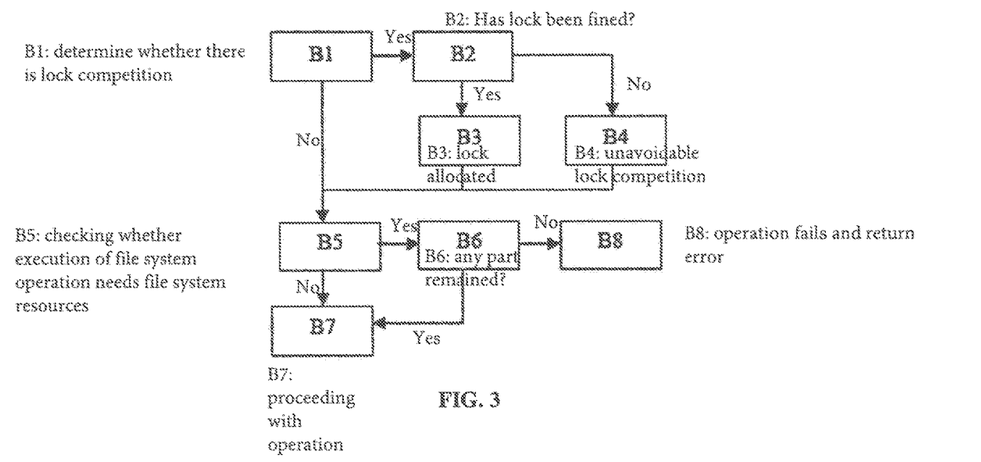
FIG. 3 is a detailed flowchart of container-level execution of the file system operation according to one preferred embodiment of the present invention.

Particularly, as shown in FIG. 3, the file system resource allocation module 302 is configured to control isolation of the file system operation through the following steps:

B1: determining whether there is lock competition among file system operations, and if yes, moving on to Step B2, or if not, moving on to Step B5;

B2: determining whether the lock under competition is a lock that has been fined and then allocated to the container, or, determining whether the lock under competition is a first lock that can be fined, and if yes, moving on to Step B3, or if not, moving on to Step B4;

B3: having each container allocated with its respective lock, thereby preventing lock competition, wherein the lock allocated to the container is the fine replica of a first lock;

B4: seeing unavoidable lock competition because the lock under competition cannot be fined;

B5: checking whether execution of the file system operation needs file system resources, if yes, moving on to Step B6, or if not, moving on to Step B7;

B6: determining whether the file system resources required for the file system operation has any part remained, and if the container is tagged as "restricted", determining whether the resources required for the operation does not exceed the file system resources allocated to the container during creation of the container; or, if the container is tagged as "unrestricted", determining whether the resources for the operation does not exceed the remaining resources of the underlying file system, and where the file system resources has a part remained, moving on to Step B7, or where the file system resources does not have a part remained, moving on to Step B8;

B7: proceeding with the operation; and

B8: determining that execution of the operation fails and returning an error.

Preferably, whenever a step (i.e. a command) of execution of the file system operation needs to acquire a lock, the risk of lock competition exists. For example, since there is only a file-system-level lock in the system, when execution of the file system operation needs to acquire a file-system-level lock, lock competition is unavoidable. The system has a large number of directories, so the number of directory-level locks is related to the number of directories in the file system. Thus, where execution of the file system operation needs to acquire directory-level locks, a chance of competition exists. Particularly, if plural file systems operate the same directory, competition happens, and if they operate different directories, there is no competition. In the present invention, determining whether there is lock competition existing in the file system operation means that: whenever any step in the execution of file operation needs to acquire a lock, it is determined that competition exists. For example, in a case where a container executes rename operation, if locking is performed according to the initial locking logic, the first to acquire is coarse-grained file-system-level locks, and then locks for the source directory and the destination directory for rename. Therefore, before every time a lock is acquired, the file system operation is determined as having lock competition so that the file system operation executes Step B2 for further determination. Where the execution of file system needs to acquire file-system-level locks first, since file-system-level locks have been fined and allocated to the UnionFS instance of each container, Step B2 is skipped directly and Step B3 is executed instead. In Step B3, only the fined locks in the UnionFS instance in each of the containers are acquired and lock competition can be prevented. Since the locks corresponding to the source directory and the destination directory have nor undergone fine-grained allocation, the locks for determining competition cannot be fined so that execution cannot skip Step B2 and Step B3 and jump to Step B4. In other words, every command in execution flow of a file system operation needs to receive determination from Step B1 through Step B8. Preferably, the commands needing locks or file system resources only take up a very small part in an operation, and most commands in a file system operation do not acquire locks and do not apply for file system resources. As a result, most commands have their flow directly enter B7.

In S3: when a container is deleted, all the file system resources used in the life cycle of the container are deleted and become allocable again. To keep information about the remaining resources consistent, it is necessary to retrieve the resources initially allocated to the container, and update the relevant information.

Figure 4:
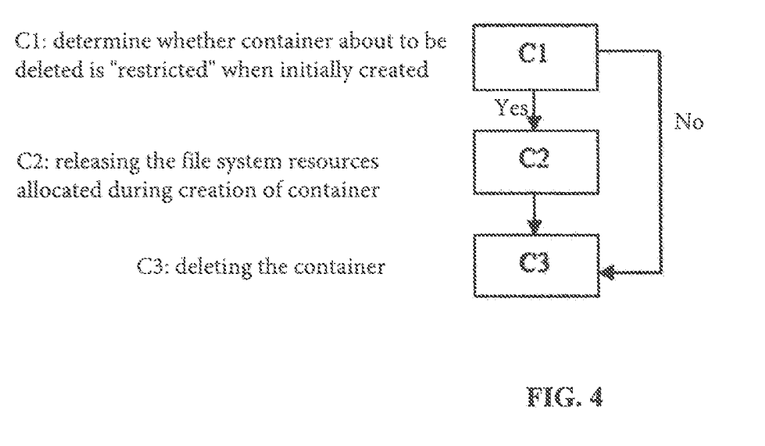
FIG. 4 is a detailed flowchart of deletion of containers according to one preferred embodiment of the present invention.

Particularly, as shown in FIG. 4, the file system resource allocation module 302 is configured to retrieve the file system resources by:

C1: determining whether the container about to be deleted was tagged as "restricted" when initially created and if yes, moving on to Step C2, or moving on to Step C3 if no;

C2: releasing the file system resources allocated during creation of the container, and altering the remaining amount of the host file system resources; and C3: deleting the container.

It should be noted that the above specific embodiments are exemplary, persons skilled in the art can devise various solutions under the inspiration of the disclosed content of the present invention, and the solutions also belong to the disclosed scope of the present invention and fall into the protection scope of the present invention. Persons skilled in the art shall understand that the specification and its drawings of the present invention are exemplary and do not limit the claims. The protection scope of the present invention is limited by the claims and its equivalents.

What is claimed is:

1. A Docker-container-oriented method for isolation and allocation of host file system resources according to access requests specifying a lock requirement from a set of new containers, wherein the method comprises the steps of:

checking lock resources during host file system operation to find out a predetermined amount of coarse-grained locks based on locks used corresponding to the access requests specifying the lock requirement;

classifying the lock resources into first locks that can be fine-grained and second locks that cannot be fine-grained based on granularity of the lock resources;

creating a plurality of new containers by configuring fine-grained replicas of the first locks and synchronously allocating a fine-grained replica of the fine-grained replicas to each new container of the plurality of new containers;

determining whether a remaining file system resources available can satisfy the needs of the plurality of new containers according to file resource request parameters of the plurality of new containers;

allocating the host file system resources according to the file resource request parameters required by the new containers and classifying the plurality of new containers as first tag containers, based on determining that the remaining host file system resources available satisfies the needs of the plurality of new containers;

performing no allocation of initial host file system resources to the plurality of new containers when the remaining host file system resources available does not satisfy the needs of the plurality of new containers, and classifying the plurality of new containers as second tag containers;

wherein in response to the first flag containers and the second tag containers executing the host file system operation that shows lock competition or needs to use the host file system resources, controlling execution of the host file system operation according to an amount of the host file system resources that have been allocated to the first tag container or the second tag container;

where in response to determining that the first tag containers have been deleted, releasing the host file system resources allocated thereto and updating the remaining amount of the host file system resources;

ending the host file system operation corresponding to the second tag containers by deleting the second tag containers directly; and wherein the allocation of the host file system resources is executed during creation of the new containers, and the determining of whether a remaining host file system resources satisfies the file resource request parameter, further comprises:

where the remaining amount of the host file system resources is greater than or equal to an amount of resources required by the creation of the new containers, allocating the remaining amount of the host file system resources required by the new containers and classifying these new containers as the first tag containers, and where the remaining amount of the host file system resources is smaller than the amount of resources required by the creation of the new containers, allowing the new containers to share all the remaining host file system resources and classifying these new containers as the second tag containers, wherein the step of controlling the execution of the host file system operation further comprises the steps of:

determining whether there is a lock competition in the host file system operation, and wherein the lock competition in the host file system operation is about the first locks, preventing the new containers from the lock competition by making the new containers acquire the fine-grained replicas;

where the host file system operation requires the host file system resources, configuring the first tag containers for:

proceeding with the host file system operation if the host file system resources required by the host file system operation does not exceed the host file system resources allocated for it, and configuring the second tag containers for:

proceeding with the host file system operation if the host file system resources required by the host file system operation does not exceed the remaining host file system resources.

2. The method for isolation of the host file system resources of claim 1, wherein the fine-grained replicas of the first lock are configured to the new containers by:

configuring relevant UnionFS instances for the new containers, and adding relevant field information to source codes of a container file system so that the fine-grained replicas are included in container file system instances corresponding to the new containers during the creation of the new containers; and configuring at least one new lock function for the UnionFS instances, so that when the new containers execute the host file system operation, the new containers acquire the fine-grained of the corresponding UnionFS instances according to a lock function.

3. The method for isolation of the host file system resources of claim 2, wherein further including at least addressing demands for the host file system resources according to characteristics of workloads operated by the new containers during the creation of the new containers, in which:

the host file system resources at least comprise file system soft resources composed of inodes and file descriptors.

* * * * *